April 15, 1969  B. REDMOND  3,438,455

SEAT BELT SAFETY SYSTEM FOR MOTOR VEHICLES

Filed April 28, 1967

INVENTOR.
BENJAMIN REDMOND
BY
MORGAN, FINNEGAN, DURHAM
& PINE
ATTORNEYS

United States Patent Office 3,438,455
Patented Apr. 15, 1969

3,438,455
SEAT BELT SAFETY SYSTEM FOR MOTOR VEHICLES
Benjamin Redmond, 520 E. 77th St., New York, N.Y. 10021
Filed Apr. 28, 1967, Ser. No. 634,581
Int. Cl. B60k 27/08, 33/00, 23/00
U.S. Cl. 180—82                    3 Claims

ABSTRACT OF THE DISCLOSURE

A seat belt safety system for motor vehicles wherein all seat belts of the vehicle are elements of a common electrical circuit operative to control the drive system of the vehicle and wherein an unbuckled seat belt in any occupied seat of the vehicle will automatically prevent placing of the vehicle in motion while permitting running of the vehicle's engine with the vehicle at rest.

Background of the invention

This invention relates generally to seat belt safety systems for automobiles and more particularly to seat belt safety systems which will permit the engine of the automobile to be started and run with a given seat belt unfastened and when the transmission gear selector lever is in a "park" or "neutral" position, but which will prevent shifting of the lever into a position for effecting forward or reverse movement of the automobile unless the seat belt is buckled.

Seat belt safety systems have been proposed in the patented prior art which will prevent the engine of the automobile from being started unless and until the safety belt is fastened. Such systems suffer from the fact that a driver cannot run the engine before taking off, either to warm up or cool off the car, or for listening to the engine for noises, or even to clean the windshield or charge up his battery. An example of such a known system is presented by the Simon Patent No. 2,802,073 of Aug. 6, 1957.

Other seat belt systems have been proposed in which upon failure to fasten the belt of an occupied seat, the driver's attention is directed to that fact upon the automobile reaching a certain velocity, either by means of an alarm or by means of mechanisms that cause the engine to stop or, in any case, prevent further increase in velocity of the vehicle. An example of such a system is presented by the Eriksson Patent No. 3,226,674 of Dec. 28, 1965.

Still other seat belt systems have been proposed in which starting of the engine with the driver's seat belt unfastened, is possible, and in which operation of the vehicle is possible if the driver's seat belt is fastened but in which any unfastened passenger's seat belt is evidenced only by a warning signal. An example of such a known system is presented by the Garner, Jr., Patent No. 3,269,843 of Aug. 30, 1966.

Summary of the invention

The present invention was developed to avoid the disadvantages of the known seat belt safety systems and to provide an improved safety seat belt system that automatically includes any occupied seat, whether driver's or passenger's, as a control on the vehicle drive system so that, although the engine may be started, the vehicle cannot be placed in motion unless and until the seat belt of each and every occupied seat is buckled. Moreover, when the vehicle is in motion, unbuckling, intentionally or accidentally, of a seat belt of an occupied seat will, preferably, serve to actuate a suitable indicating device, such, for example, as a light or buzzer so as to warn the driver, but will not otherwise interfere with the vehicle's motion or normal operation of the vehicle by the driver.

Brief description of the drawing

In the accompanying drawing which forms part of the instant specification and is to be read in conjunction therewith and in which like numbers refer to like parts throughout the views.

Description of the preferred embodiment

Figure 1:
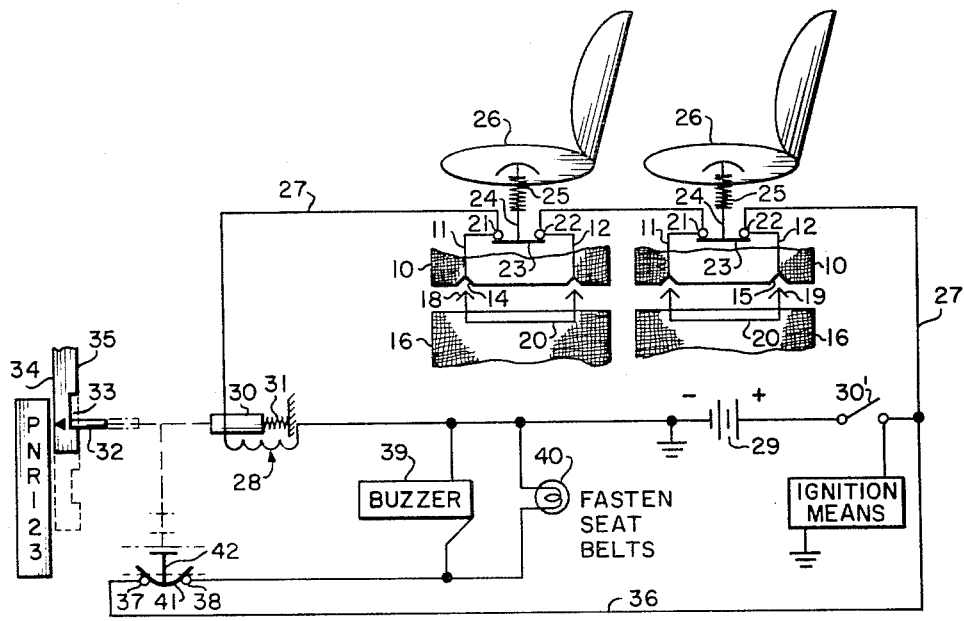
FIG. 1 is a schematic view of a presently preferred embodiment of a safety seat belt system in accordance with this invention.
Figure 2:
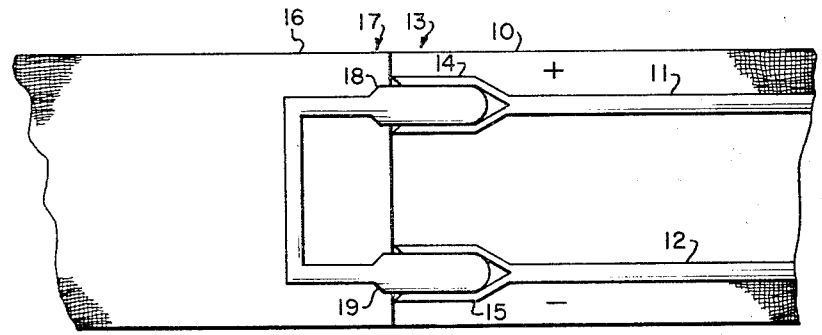
FIG. 2 is a fragmentary diagrammatic view of a seat belt of the system of FIG. 1.

Referring now more particularly to FIG. 2 of the drawing, seat belt section 10 of woven fabric material is provided with a pair of metal electrical conductors 11 and 12 extending length-wise of the belt section and terminating at the free end 13 of the belt section in a pair of female electrical terminals 14 and 15, respectively. Likewise, the belt section 16, also of woven fabric material, is provided with a pair of male metal electrical terminals 18 and 19 which project outwardly from the free end 17 of the section for a distance sufficient for them to be slidably received and seat in the female terminals 14 and 15, respectively, of the belt section 10. A metal link 20 in the belt section 16 electrically connects the terminal fittings 18 and 19 within the belt section 16 so that a continuous electrical path is provided through the belt sections 10 and 16 when they are coupled as shown, via conductor 11, female terminal 14, male terminal 18, link 20, male terminal 19, female terminal 15 and conductor 12. It will be understood that the inner or free ends 13 and 17 of the belt sections 10 and 16, respectively, will be provided with suitable known male and female tongue and buckle elements (not shown) for separably connecting the belt sections in known manner and in usual fashion. It will be understood also that the outer ends of the belt sections 10 and 16 will be suitably secured in known manner to the vehicle in association with a seat of the vehicle. Two such seats are indicated in FIG. 1 but it will be understood that a "seat" may be a driver's or a passenger's seat and as many individual "seats" are contemplated as the vehicle permits.

The belt section 10 has its conductors 11 and 12 connected at the end remote from its free end 13 to switch terminals 21 and 22 which are normally connected together electrically by a displaceable switch element 23. The latter is carried at one end of an actuating plunger 24 whose other end is suitably operably connected to the internal spring structure 25 of a seat cushion 26 of the vehicle so that when the seat is occupied the plunger 24 will be displaced downwardly axially against the action of the seat spring structure, thereby causing the switch element 23 also to be displaced downwardly and thus break the circuit between the terminals 21 and 22. It will be observed however that if the belt sections 10 and 16 are connected as is the case when the belt is "buckled," the shunt electrical circuit through the belt formed by the series-connected conducting elements 11, 14, 18, 20, 19, 15 and 12, will maintain a conducting circuit between the terminals 21 and 22.

Each of the pairs of seat switch terminals 21 and 22 is connected in a series electrical circuit 27 which includes a solenoid 28, battery 29 and switch 30' for opening and closing the series circuit. Preferably, the battery 29 is the vehicle battery and the switch 30' the ignition switch or combination ignition-starter switch of the vehicle.

The solenoid plunger 30 is spring-pressed axially at one end by means of a spring 31 and carries a detent member 32 which is normally seated by means of the spring in a groove 33 in the gear selector lever 34 of the vehicle transmission. In these circumstances, the lever 34 may be moved between "park" and "neutral" position but not to a vehicle-operating position.

Assuming that the left-hand seat as viewed in FIG. 1 is occupied by the driver and that the right-hand seat in FIG. 1 is vacant, the weight of the driver in the occupied seat moves the switch element 22 associated with the driver's seat down out of contact with the associated terminals 21 and 22. If the drivers' seat belt is not buckled at this time, the conductors 11 and 12 in the driver's seat belt section 10 will not be connected through the link 20 in belt section 16 and an open circuit will exist across terminals 21 and 22 even though ignition switch 30' is "closed." Solenoid 28 will remain unenergized and, although the vehicle engine may be started and run, the vehicle cannot be moved. This may be overcome by the driver buckling his seat belt, thus closing the circuit between terminals 21 and 22 of the driver's seat and energizing solenoid 28. Energizing of solenoid 28 retracts the solenoid plunger 30 against the resistance of the spring 31 and effects withdrawal of the detent 32 from the groove 33 to the dash-dot position shown in FIG. 1. The selector lever 34 may now be moved to the desired operating position as, for example, to the dotted line position shown wherein the indicating arrow would be at 1. In this position, the detent 32 would be opposed by the flat face 35 of the selector lever and, were the solenoid 28 to become de-activated, as would be the case were the driver to unbuckle his seat belt, the detent 32 would merely be pressed against the face 35. Forward movement of the vehicle would not be affected unless and until the selector lever is moved back to the "park" or "neutral" position thus enabling the detent to seat itself in the groove 33.

Assuming however that both the driver's seat and a passenger's seat (the right-hand seat in FIG. 1) were occupied to begin with and that the selector lever 34 were in "park" or "neutral" position, the switch elements 23 associated with both the occupied driver's seat and the occupied passenger's seat would be displaced downwardly away from both sets of contacts 21 and 22. If either the driver's seat belt or the passenger's seat belt is not buckled under these circumstances an open circuit would exist across the set of contacts 21 and 22 of the driver's or passenger's seat as the case may be. Current would not flow in the solenoid circuit and the seated detent 32 would prevent movement of the selector lever 34 to an operating position until the unbuckled seat belt is buckled to close the solenoid circuit. Again, if this is done and the vehicle placed in motion, it may be continued in motion thereafter even if the driver or passenger or both unbuckles his seat belt since the detent 32 would merely be released and come to rest on the selector face 35.

Preferably, however, means are provided for giving an audible or visual indication that a seat belt in an occupied seat, is unbuckled. As here preferably embodied, an alarm circuit 36 is provided in parallel with the seat belt circuit 27 and includes a pair of switch-operated terminals 37 and 38 in series with the battery 29, the ignition switch 30' and with a buzzer 39 and a signal light 40 in parallel with each other.

A reciprocable flexible switch member 41 having an axially movable actuating arm 42 secured thereto is mounted to the solenoid plunger 30 so as to be movable out of and into engagement with the terminals 37 and 38. The switching member 41 is preferably an elongated, thin resilient metal strip of electrical conductive material such, for example, as copper. Normally, this member is held in firm engagement with the terminals 37 and 38 by the solenoid plunger 30 under the action of the solenoid spring 31. In its engaged position and by reason of its flexibility it is deformed from its normal planar configuration and assumes an arcuate shape, as depicted by the solid line position thereof in FIGURE 1. When fully retracted by the plunger 30 to the dot-dash line position shown in FIG. 1, it is restored to its normal planar configuration and is wholly separated from the terminals 37 and 38 and the alarm circuit 36 is "open." In an intermediate position indicated by the dash lines in FIG. 1, it merely rests upon the terminals 37 and 38 with sufficient pressure to maintain the circuit closed between these terminals.

As has been noted above, when the vehicle is in motion and the belt circuit 27 is broken by the unbuckling of a belt in an occupied seat, the detent 32 is urged by the spring-pressed plunger 30 against the face 35 of the selector lever 34. This position of the plunger 30 corresponds to the above-noted intermediate position (dash line position) of the switch member 42. In this position the alarm circuit is closed and an unbuckled seat belt will be indicated automatically to the driver audibly by a buzzer 39 and visually by the signal light 40.

Having thus described my invention, what I claim is:

1. A safety seat belt system for use with a motor vehicle having an engine ignition system, drive train means including control means therefor shiftable between an engine starting position and at least one drive position, for transmitting power from the vehicle engine to the vehicle drive wheels, safety seat belt means for releasably securing the operator to the driver's seat of the vehicle and at least one other safety seat belt means for releasably securing a passenger to a passenger's seat of the vehicle, said safety seat belt means each including a pair of separable seat belt sections, the sections of each pair being adapted to be releasably connected together and providing an electrical circuit through at least one section of the pair when connected, comprising:

means normally locking said control means in the engine starting position;

switch means associated with the driver's seat and other switch means associated with said passenger seat, each said switch means being responsive to the weight of the seat occupant so as to be closed when the associated seat is unoccupied and open when the associated seat is occupied;

normally de-energized solenoid means in electrical circuit with the engine ignition system, with each of said switch means and with the electrical circuits of said seat belt sections, said solenoid means being only operable in response to the connection of all of the seat belt sections of all of the occupied seats for releasing said locking means when the seat belt sections of all of the occupied seats are connected, whereby said control means may be shifted from an engine starting position to a drive position.

2. A safety seat belt system for use with a motor vehicle having an engine ignition system, transmission means including gear selector means therefor shiftable between an engine starting position and at least one drive position, safety seat belt means for releasably securing the operator to the driver's seat of the vehicle and at least one other safety seat belt means for releasably securing a passenger to a passenger's seat of the vehicle, said safety seat belt means each including a pair of separable seat belt sections, the sections of each pair being adapted to be releasably connected together and providing an electrical circuit through at least one section of the pair when connected, comprising:

means normally locking said transmission gear selector means in the engine starting position;

switch means associated with the driver's seat and other switch means associated with said passenger seat, each said switch means being responsive to the weight of the seat occupant so as to be closed when the associated seat is unoccupied and open when the associated seat is occupied;

normally de-energized solenoid means in electrical circuit with the engine ignition system, with each of said switch means and with the electrical circuits of said seat belt sections, said solenoid means being only operable in response to the connection of all of the seat belt sections of all of the occupied seats for releasing said locking means when the seat belt sections of all of the occupied seats are connected, whereby said gear selector means may be shifted from an engine starting position to a drive position.

3. A safety seat belt system for use with a motor vehicle having an engine ignition system, drive train means including control means therefor shiftable between an engine starting position and at least one drive position, for transmitting power from the vehicle engine to the vehicle drive wheels, safety seat belt means for releasably securing the operator to the driver's seat of the vehicle and at least one other safety seat belt means for releasably securing a passenger to a passenger's seat of the vehicle, said safety seat belt means each including a pair of separable seat belt sections, the sections of each pair being adapted to be releasably connected together and providing an electrical circuit through at least one section of the pair when connected, comprising:

means normally locking said control means in the engine starting position;

switch means associated with the driver's seat and other switch means associated with said passenger seat, each said switch means being responsive to the weight of the seat occupant so as to be closed when the associated seat is unoccupied and open when the associated seat is occupied;

normally de-energized solenoid means in electrical circuit with the engine ignition system, with each of said switch means and with the electrical circuits of said seat belt sections, said solenoid means being operable in response to the connection of the seat belt sections of the occupied seats for releasing said locking means when the seat belt sections of all of the occupied seats are connected, whereby said control means may be shifted from an engine starting position to a drive position; and a signalling circuit having switch means responsive to said solenoid means, for indicating that the seat belt sections of an occupied seat are disconnected when the vehicle is in motion.

References Cited

UNITED STATES PATENTS

| | | | |
|---|---|---|---|
| 3,074,055 | 1/1963 | Rudolph et al. | 340—278 |
| 3,215,221 | 11/1965 | Rayman | 180—82 |
| 3,226,674 | 12/1965 | Eriksson | 340—53 |
| 3,269,483 | 8/1966 | Garner | 180—103 |

KENNETH H. BETTS, *Primary Examiner.*

U.S. Cl. X.R.

340—52, 278